(12) United States Patent
Takeda et al.

(10) Patent No.: US 12,033,776 B2
(45) Date of Patent: Jul. 9, 2024

(54) NON-ORIENTED ELECTRICAL STEEL SHEET AND METHOD FOR MANUFACTURING SAME

(71) Applicant: NIPPON STEEL CORPORATION, Tokyo (JP)

(72) Inventors: Kazutoshi Takeda, Tokyo (JP); Minako Fukuchi, Tokyo (JP); Yoshiaki Natori, Tokyo (JP); Hiroyasu Fujii, Tokyo (JP); Shinsuke Takatani, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/276,857

(22) PCT Filed: Mar. 30, 2022

(86) PCT No.: PCT/JP2022/016210
§ 371 (c)(1),
(2) Date: Aug. 10, 2023

(87) PCT Pub. No.: WO2022/210947
PCT Pub. Date: Oct. 6, 2022

(65) Prior Publication Data
US 2024/0047107 A1   Feb. 8, 2024

(30) Foreign Application Priority Data
Mar. 31, 2021   (JP) .................. 2021-060499

(51) Int. Cl.
*H01F 1/147* (2006.01)
*C21D 6/00* (2006.01)
(Continued)

(52) U.S. Cl.
CPC ......... *H01F 1/14783* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS

| | | |
|---|---|---|
| 2005/0064107 A1 | 3/2005 | Komori et al. |
| 2018/0033529 A1 | 2/2018 | Takeda et al. |
| 2022/0341043 A1 | 10/2022 | Takeda et al. |

FOREIGN PATENT DOCUMENTS

| | | |
|---|---|---|
| CN | 101910463 A | 12/2010 |
| EP | 0 625 582 A2 | 11/1994 |

(Continued)

*Primary Examiner* — Anthony M Liang
(74) *Attorney, Agent, or Firm* — Birch, Stewart, Kolasch & Birch, LLP

(57) ABSTRACT

This non-oriented electrical steel sheet includes a base steel sheet (10); and an insulation coating (20) formed on a surface of the base steel sheet (10), in which the insulation coating (20) contains a metal phosphate and an organic resin, an arithmetic mean of a center line average roughness $Ra_{75}$ of the insulation coating (20) in a rolling direction of the base steel sheet (10) and a center line average roughness $Ra_{75}$ of the insulation coating (20) in a direction perpendicular to the rolling direction is 0.20 to 0.50 μm, and the amount of nitrogen in the insulation coating (20) is 0.05 to 5.00 mass %.

9 Claims, 1 Drawing Sheet

(51) Int. Cl.
*C21D 9/46* (2006.01)
*C22C 38/02* (2006.01)
*C22C 38/04* (2006.01)
*C22C 38/06* (2006.01)
*C23C 22/03* (2006.01)

(52) U.S. Cl.
CPC ............... C21D 9/46 (2013.01); C22C 38/02 (2013.01); C22C 38/04 (2013.01); C22C 38/06 (2013.01); C23C 22/03 (2013.01); C22C 2202/02 (2013.01)

(56) References Cited

FOREIGN PATENT DOCUMENTS

| JP | 5-287545 A | 11/1993 |
|---|---|---|
| JP | 7-41913 A | 2/1995 |
| JP | 10-46350 A | 2/1998 |
| JP | 2002-249881 A | 9/2002 |
| JP | 2002249881 A * | 9/2002 |
| JP | 2003-213334 A | 7/2003 |
| JP | 2017-141480 A | 8/2017 |
| WO | WO 2009/084777 A1 | 7/2009 |
| WO | WO 2016/136515 A1 | 9/2016 |
| WO | WO 2021/054450 A1 | 3/2021 |

* cited by examiner

NON-ORIENTED ELECTRICAL STEEL SHEET AND METHOD FOR MANUFACTURING SAME

TECHNICAL FIELD

The present invention relates to a non-oriented electrical steel sheet and a method for manufacturing the same. Priority is claimed on Japanese Patent Application No. 2021-060499, filed Mar. 31, 2021, the content of which is incorporated herein by reference.

BACKGROUND ART

Non-oriented electrical steel sheets are used for motors for driving small home appliances such as audio devices, and iron cores (motor cores (rotor cores and stator cores)) for motors for driving hybrid cars and electric cars.

An insulation coating is formed on the surface of the non-oriented electrical steel sheet. Insulation coatings, for example, ensure insulation properties between electrical steel sheets laminated as a stator core. That is, insulation coatings are preferred to have exceptional insulation properties. Insulation coatings more preferably have adhesion with respect to steel sheets. For this reason, insulation coatings preferably have not only insulation properties but also adhesion.

Insulation coatings of non-oriented electrical steel sheets having exceptional insulation properties and adhesion have been proposed, for example, in PCT International Publication No. WO2016/136515 (Patent Document 1) and Japanese Unexamined Patent Application, First Publication No. 2017-141480 (Patent Document 2).

An electrical steel sheet disclosed in Patent Document 1 has, on the surface of the steel sheet, an insulation coating containing: a binder that consists of 100 parts by mass of a metal phosphate and 1 to 50 parts by mass of an organic resin having an average particle size of 0.05 to 0.50 μm; and a carboxylic acid compound having 2 to 50 carbon atoms in an amount of 0.1 to 10.0 parts by mass with respect to 100 parts by mass of a solid content of the binder, in which the organic resin is composed of one or more selected from the group consisting of acrylic resins, epoxy resins, and polyester resins. It is described in Patent Document 1 that, even if this insulation coating does not contain a chromium compound, it has not only exceptional insulation properties but also has exceptional adhesion, corrosion resistance, appearance, and rust preventive properties at end surfaces after punching.

An electrical steel sheet disclosed in Patent Document 2 has, on its surface, an insulation coating composed of 100 parts by mass of a metal phosphate as a main component, 1 to 50 parts by mass of an acrylic resin which has an average particle size of 0.05 to 0.50 μm and in which a reactive emulsifier is used, and 0.5 to 10 parts by mass of a polyhydric alcohol, in which metal elements of the metal phosphate include at least a divalent metal element and a trivalent metal element together, and a formulation proportion of the divalent metal element in the total mass of the metal elements of the metal phosphate is 30 to 80 mass %. It is described in Patent Document 2 that, even if this insulation coating is applied thinly to improve the space factor, it has good uniformity, no insulation problem, and exceptional adhesion to resins during electrodeposition coating and molding.

CITATION LIST

Patent Documents

Patent Document 1

PCT International Publication No. WO2016/136515

Patent Document 2

Japanese Unexamined Patent Application, First Publication No. 2017-141480

SUMMARY OF THE INVENTION

Problems to be Solved by the Invention

Incidentally, a method for manufacturing a stator core using a non-oriented electrical steel sheet is as follows. Non-oriented electrical steel sheets are punched into a predetermined shape. The steel sheets (core blanks) after punching are laminated and fixed to manufacture a laminated iron core. A coil is placed in a slot of the stator core. During punching processing, processing strains are given to the punched non-oriented electrical steel sheets, and the magnetic properties deteriorate. For this reason, stress relief annealing is sometimes carried out to remove the processing strains. Annealing is at a high temperature of 700° C. or higher. Insulation coatings heated during annealing sometimes produce decomposition products due to heating.

As described above, insulation coatings of non-oriented electrical steel sheets are preferred to have exceptional adhesion even after stress relief annealing. In a case where adhesion is reduced, coating pieces peeled off from a steel sheet will enter between a stator core and a rotor core and hinder rotation of the stator core and the rotor core. In some cases, there is a concern that the rotor core may be damaged.

The decomposition products of the insulation coatings produced through heating during annealing sometimes contain nitrogen oxides (so-called NOx) such as nitrogen monoxide (NO) and nitrogen dioxide ($NO_2$). NOx sometimes damages an annealing furnace or becomes a causative substance of air pollution. For this reason, it is preferable for emission of NOx to be suppressed during punching processing and annealing of a laminated iron core after lamination.

An object of the present invention is to provide: a non-oriented electrical steel sheet including an insulation coating capable of achieving both exceptional adhesion and suppression of the amount of $NO_x$ emitted; and a method for manufacturing a non-oriented electrical steel sheet including an insulation coating capable of achieving both exceptional adhesion and suppression of the amount of NOx emitted.

Means for Solving the Problem

A non-oriented electrical steel sheet of the present invention includes: a base steel sheet; and an insulation coating formed on a surface of the base steel sheet, in which the insulation coating contains a metal phosphate and an organic resin, an arithmetic mean of a center line average roughness $Ra_{ys}$ of the insulation coating in a rolling direction of the base steel sheet and a center line average roughness $Ra_{75}$ in a direction perpendicular to the rolling direction is 0.20 to 0.50 m, and the amount of nitrogen in the insulation coating is 0.05 to 5.00 mass %.

A method for manufacturing the non-oriented electrical steel sheet of the present invention includes: applying a surface treatment agent containing a metal phosphate and an organic resin to a surface of a base steel sheet; and heating the base steel sheet to which the surface treatment agent is applied at a heat treatment temperature of 200° C. to 450° C., a dew point of 0° C. to 30° C., a heat treatment time of 10 to 60 seconds, and any temperature increase rate shown in temperature increase conditions (1) to (3) to form an insulation coating.

Temperature increase condition (1): the temperature increase rate is 20 to 40° C./s in a case where a concentration of the surface treatment agent is less than 16 wt %.

Temperature increase condition (2): the temperature increase rate is 5° C./s or higher and lower than 20° C./s in a case where the concentration of the surface treatment agent is 16 wt % or more and less than 30 wt %.

Temperature increase condition (3): the temperature increase rate is slower than 5° C./s in a case where the concentration of the surface treatment agent is 30 wt % or more.

Effects of the Invention

The non-oriented electrical steel sheet according to the above-described aspect of the present invention includes an insulation coating capable of achieving both exceptional adhesion and suppression of the amount of NOx emitted. The method for manufacturing a non-oriented electrical steel sheet according to the above-described aspect of the present invention can manufacture a non-oriented electrical steel sheet including an insulation coating capable of achieving both exceptional adhesion and suppression of the amount of NOx emitted.

EMBODIMENT FOR IMPLEMENTING THE INVENTION

Figure 1:
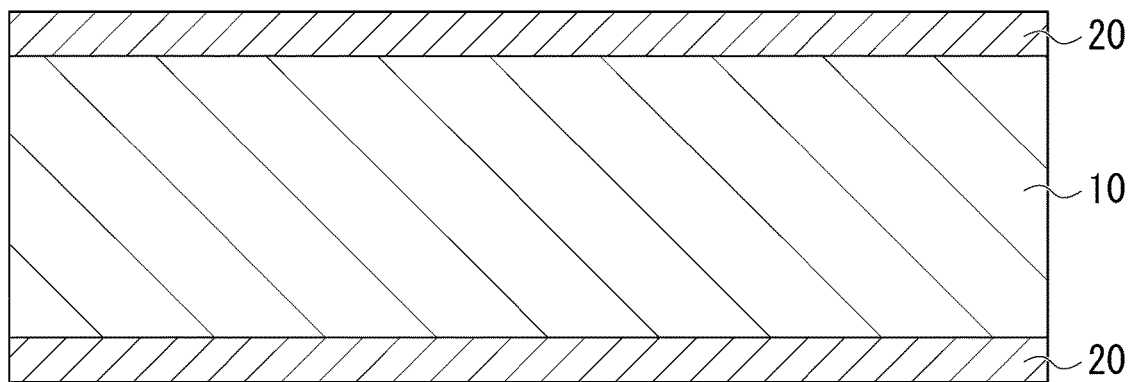
FIG. 1 is a cross-sectional view of a non-oriented electrical steel sheet of the present embodiment in the sheet thickness direction.

The present inventors have investigated and studied both exceptional adhesion and suppression of the amount of NOx emitted of an insulation coating of a non-oriented electrical steel sheet.

The present inventors have first studied a way for enhancing adhesion of the insulation coating with respect to the non-oriented electrical steel sheet. Patent Document 1 and Patent Document 2 described above describe that an insulation coating containing a metal phosphate and an organic resin has exceptional adhesion. Accordingly, the present inventors have studied a way for further enhancing adhesion of the insulation coating containing the metal phosphate and an organic resin.

As a result of the studies of the present inventors, it has been found that in the case of the above-described insulation coating containing the metal phosphate and an organic resin, adhesion is enhanced if nitrogen is contained in the insulation coating. Although the reason why the adhesion is enhanced due to the insulation coating containing nitrogen is unclear, it is thought to be as follows, for example.

A base steel sheet is a metal and has a hydroxyl group on its surface. In addition, the metal phosphate has high polarity. On the other hand, the organic resin has low polarity because it contains many hydrocarbons which are non-polar groups. For this reason, simply incorporating the organic resin in the metal phosphate results in low compatibility between the organic resin and the metal phosphate. In this case, the adhesion of the insulation coating is reduced. However, if the insulation coating contains nitrogen, the nitrogen enhances the compatibility between the metal phosphate and the organic resin. Accordingly, it is thought that the adhesion of the insulation coating is enhanced by hydrogen bonding between the organic resin, the base steel sheet, and the metal phosphate.

However, simply incorporating nitrogen into the insulation coating cannot suppress emission of NOx. Therefore, assuming that nitrogen is incorporated, the amount of nitrogen in the insulation coating is controlled. If the amount of nitrogen in the insulation coating is low, the amount of nitrogen which is a generation source of NOx is small, so emission of NOx is suppressed.

In addition, the surface roughness of the insulation coating is also an important influencing factor in enhancing adhesion after stress relief annealing. If the surface roughness is too small, large cracks are likely to occur during stress relief annealing and adhesion is reduced.

Based on the results of the above studies, the present inventors have studied insulation coatings capable of achieving both exceptional adhesion and suppression of the amount of NOx emitted. As a result, they have found that adhesion of an insulation coating can be enhanced and the amount of NOx emitted can be suppressed if the insulation coating contains the metal phosphate and an organic resin, the amount of nitrogen in the insulation coating is 0.05 to 5.00 mass %, and an arithmetic mean of a center line average roughness $Ra_{75}$ of the insulation coating in a rolling direction of a base steel sheet and a center line average roughness $Ra_{75}$ of the insulation coating in a direction perpendicular to the rolling direction is 0.20 to 0.50 µm.

The non-oriented electrical steel sheet of the present embodiment has been completed based on the above-described technical ideas, and the gist thereof is as follows.

[1] A non-oriented electrical steel sheet including: a base steel sheet; and an insulation coating formed on a surface of the base steel sheet, in which the insulation coating contains the metal phosphate and an organic resin, an arithmetic mean of a center line average roughness Ra75 of the insulation coating in a rolling direction of the base steel sheet and a center line average roughness Ra75 of the insulation coating in a direction perpendicular to the rolling direction is 0.20 to 0.50 µm, and the amount of nitrogen in the insulation coating is 0.05 to 5.00 mass %.

[2] The non-oriented electrical steel sheet according to [1], in which the metal phosphate contains one or more selected from the group consisting of Zn phosphate, Mn phosphate, Al phosphate, and Mo phosphate, and the organic resin contains an epoxy resin as a main component.

Here, the expression "contains an epoxy resin as a main component" means that the amount of the epoxy resin in the organic resin is 50% or more by mass %.

[3] The non-oriented electrical steel sheet according to [1] or [2], in which the insulation coating contains an amine compound.

[4] The non-oriented electrical steel sheet according to any one of [1] to [3], in which the amine compound is one or more selected from the group consisting of alkylamines, alkanolamines, polyamine compounds, isocyanate compounds, blocked isocyanate compounds, aromatic amine compounds, and nitrogen-containing heterocyclic compounds.

[5] The non-oriented electrical steel sheet according to any one of [1] to [4], in which the base steel sheet contains, by mass %, Si: 2.5% to 4.5%, Al: 0.1% to 1.5%, and Mn: 0.2% to 4.0%.

In addition, the non-oriented electrical steel sheet described above can be manufactured, for example, through the following manufacturing method.

[6] A method for manufacturing a non-oriented electrical steel sheet, the method including: applying a surface treatment agent containing the metal phosphate and an organic resin to a surface of a base steel sheet; and heating the base steel sheet to which the surface treatment agent is applied at a heat treatment temperature of 200° C. to 450° C., a dew point of 0° C. to 30° C., a heat treatment time of 10 to 60 seconds, and any temperature increase rate shown in temperature increase conditions (1) to (3) to form an insulation coating.

Temperature increase condition (1): the temperature increase rate is 20 to 40° C./s in a case where a concentration of the surface treatment agent is less than 16 wt %.

Temperature increase condition (2): the temperature increase rate is 5° C./s or higher and lower than 20° C./s in a case where the concentration of the surface treatment agent is 16 wt % or more and less than 30 wt %.

Temperature increase condition (3): the temperature increase rate is slower than 5° C./s in a case where the concentration of the surface treatment agent is 30 wt % or more.

Hereinafter, the non-oriented electrical steel sheet of the present embodiment will be described in detail.

[Configuration of Non-Oriented Electrical Steel Sheet]

FIG. 1 is a cross-sectional view of a non-oriented electrical steel sheet of the present embodiment in the sheet thickness direction. Referring to FIG. 1, a non-oriented electrical steel sheet 1 includes a base steel sheet 10 and insulation coatings 20. The insulation coatings 20 are formed on the surfaces of the base steel sheet 10. In FIG. 1, the insulation coatings 20 are respectively formed on the upper and lower surfaces of the base steel sheet 10. However, an insulation coating 20 may be formed on only either surface of the base steel sheet 10. Hereinafter, the base steel sheet 10 and the insulation coatings 20 will be described.

[Base Steel Sheet 10]

The base steel sheet 10 can be appropriately selected from well-known steel sheets used as the non-oriented electrical steel sheet 1. That is, the base steel sheet 10 is not particularly limited as long as it is a well-known steel sheet for use as the non-oriented electrical steel sheet 1.

The base steel sheet 10 has a chemical composition of basic elements and, as necessary, optional elements with the balance being Fe and impurities. The base steel sheet 10 has a chemical composition of, for example, the following elements. Hereinafter, unless otherwise specified, "%" means mass %.

[Basic Elements]

The base steel sheet 10 has a chemical composition of Si, Al, and Mn as basic elements. These elements will be described below.

Si: 2.5% to 4.5%

Silicon (Si) increases electrical resistance of steel and reduces eddy current loss. As a result, iron loss of the steel sheet decreases. Si also increases the strength of steel. If the amount of Si is less than 2.5%, the above-described effect cannot be sufficiently obtained. On the other hand, if the amount of Si is greater than 4.5%, the workability of steel deteriorates. Accordingly, the amount of Si is 2.5% to 4.5%. The lower limit of the amount of Si is preferably 2.6% and more preferably 2.7%. The upper limit of the amount of Si is preferably 4.3% and more preferably 4.2%.

Al: 0.1% to 1.5%

Aluminum (Al) increases electrical resistance of steel and reduces eddy current loss. As a result, iron loss of the steel sheet decreases. If the amount of Al is less than 0.1%, the above-described effect cannot be sufficiently obtained. On the other hand, if the amount of Al is greater than 1.5%, the saturation magnetic flux density deteriorates. Accordingly, the amount of Al is 0.1% to 1.5%. The lower limit of the amount of Al is preferably 0.15% and more preferably 0.2%. The upper limit of the amount of Al is preferably 1.4% and more preferably 1.3%.

Mn: 0.2% to 4.0%

Manganese (Mn) increases electrical resistance of steel and reduces eddy current loss. As a result, iron loss of the steel sheet decreases. Mn also suppresses formation of $\{111\}<112>$ textures, which are not preferable for magnetic properties. If the amount of Mn is less than 0.2%, the above-described effect cannot be sufficiently obtained. On the other hand, if the amount of Mn is greater than 4.0%, the textures change and hysteresis loss deteriorates. Accordingly, the amount of Mn is 0.2% to 4.0%. The lower limit of the amount of Mn is preferably 0.3% and more preferably 0.4%. The upper limit of the amount of Mn is preferably 3.8% and more preferably 3.6%.

In the present embodiment, the base steel sheet 10 has a chemical composition of impurities. Here, impurities mean elements mixed in from ore or scraps as raw materials, a production environment, and the like when the base steel sheet 10 is industrially produced. Impurities are elements such as C, P, S and N, for example.

The chemical composition of the base steel sheet 10 can be measured through a well-known chemical analysis method. For example, the chemical composition of the base steel sheet 10 may be measured through Inductively Coupled Plasma-Atomic Emission Spectrometry (ICP-AES).

[Insulation Coatings 20]

The insulation coatings 20 are formed on the surfaces of the base steel sheet 10 as described above. Non-oriented electrical steel sheets 1 are processed into core blanks and then laminated to form a motor core. The insulation coatings 20 reduce eddy currents between steel sheets (core blanks) after lamination. As a result, eddy current loss in the motor core can be reduced.

Figure 2:
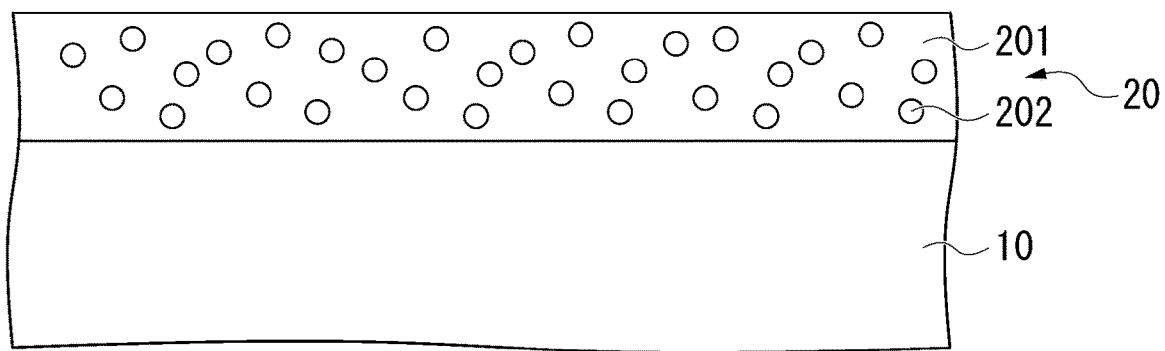
FIG. 2 is an enlarged cross-sectional view of an insulation coating 20 in FIG. 1.

FIG. 2 is an enlarged cross-sectional view of an insulation coating 20 in FIG. 1. Referring to FIG. 2, the insulation coating 20 contains the metal phosphate 201 and organic resins 202. The insulation coating 20 does not contain chromium oxide. The metal phosphate 201, the organic resins 202, and the amine compound will be described below.

[Metal Phosphate 201]

The metal phosphate 201 functions as a binder for the insulation coating 20. The metal phosphate 201 is a solid content obtained by drying an aqueous solution (insulation coating solution) containing phosphoric acid and metal ions. The type of phosphoric acid is not particularly limited, and well-known phosphoric acid can be used. Preferred phosphoric acid is one or more selected from the group consisting of orthophosphoric acid, metaphosphoric acid, and polyphosphoric acid.

Metal ions act on corrosion resistance and adhesion of the insulation coating 20. The types of metal ions are not particularly limited. Metal ions are, for example, one or more selected from the group consisting of Li, Al, Zn, Mg, Ca, Sr, Ti, Co, Mn, and Ni.

The metal phosphate preferably contains one or more selected from the group consisting of Zn phosphate, Mn phosphate, Al phosphate and Mo phosphate. The Zn phosphate effectively improves corrosion resistance of the insulation coating 20. The Mn phosphate improves heat resistance of the insulation coating 20. Al phosphate enhances adhesion of the insulation coating 20 with respect to the base steel sheet 10 and also increases heat resistance of the insulation coating 20. The Mo phosphate improves heat resistance of the insulation coating 20. The metal phosphate may further contain, in addition to Al and Zn, the above-described metal elements other than Al and Zn.

[Organic Resins 202]

Referring to FIG. 2, the organic resins 202 are dispersed and contained in the metal phosphate 201 functioning as a binder. The organic resins 202 suppress coarse growth of the metal phosphate 201 and promote polycrystallization of the metal phosphate 201. A dense insulation coating 20 is formed by the organic resins 202.

The organic resins 202 are not particularly limited, and well-known organic resins can be used. Preferred organic resins 202 consist of one or more selected from the group consisting of an acrylic resin, a polystyrene resin, a vinyl acetate resin, an epoxy resin, a polyester resin, a polyurethane resin, a polyamide resin, a phenol resin, a melamine resin, a silicon resin, a polypropylene resin, and a polyethylene resin.

The organic resins 202 are preferably epoxy resins. Epoxy resins have exceptional insulation properties and corrosion resistance. The types of epoxy resins are not particularly limited. Epoxy resins are, for example, one or more selected from the group consisting of bisphenol types A, F, and B, alicyclic types, glycidyl ether types, glycidyl ester types, biphenyl types, naphthalene types, phenol novolac types, ortho-cresol novolac types, tetraphenylolethane types, and trishydroxyphenyl methane types.

More specifically, epoxy resins are, for example, one or more selected from the group consisting of bisphenol A diglycidyl ether, caprolactone ring-opening adducts of bisphenol A diglycidyl ether, bisphenol F-diglycidyl ether, bisphenol S-diglycidyl ether, novolac glycidyl ether, glycidyl ether dimerate, derivatives of glycidyl ethers, hexahydrophthalic acid polyglycidyl ester, dimer acid glycidyl ester, and derivatives of glycidyl esters.

[Method for Measuring Metal Phosphate 201 and Organic Resins 202 in Insulation Coating 20]

The metal phosphate 201 and the organic resins 202 in the insulation coating 20 can be measured through the following method. The gas generation behavior when the non-oriented electrical steel sheet 1 on which the insulation coating 20 is formed is heated is analyzed through pyrolysis-gas chromatograph/mass spectrometry (Py-GC/MS) (hereinafter referred to as a GCIMS method) to identify the presence or absence and the types of the organic resins 202. The GC/MS method described above may be used in combination with Fourier transform infrared spectroscopic analysis (FT-IR) to identify organic resins.

Furthermore, chemical analysis is performed on the insulation coating 20 through energy dispersive X-ray spectroscopy (EDS) or ICP-AES, and if P and metal elements (such as Zn and Al) are detected, it is determined that the metal phosphate is contained in the insulation coating 20.

[Surface Roughness of Insulation Coating]

The arithmetic mean value of the surface roughness of the insulation coating 20 which is calculated after measuring Rays (center line average roughness) in the rolling direction of the base steel sheet 10 and Rays in a direction perpendicular to the rolling direction of the base steel sheet 10 is 0.20 to 0.50 m. In a case where $Ra_{75}$ of the surface roughness is less than 0.02 μm, large cracks are likely to occur during stress relief annealing and adhesion is reduced. In a case where Rays thereof is greater than 0.50 μm, the NOx generation amount may increase.

The preferred lower limit of Rays of the surface roughness is 0.25 μm, and the preferred upper limit thereof is 0.40 m. Rays is a center line average roughness described in JIS B0601:2013. Rays can be measured in accordance with JIS B0601:2013.

[Amount of Nitrogen in Insulation Coating 20]

In the insulation coating 20 of the present embodiment containing the metal phosphate 201 and the organic resins 202, in a case where the amount of nitrogen is less than 0.05 mass %, adhesion of the insulation coating 20 cannot be enhanced. On the other hand, in the insulation coating 20 of the present embodiment containing the metal phosphate 201 and the organic resins 202, in a case where the amount of nitrogen is greater than 5.00 mass %, emission of NOx during annealing cannot be suppressed. Accordingly, the amount of nitrogen in the insulation coating 20 is 0.05 to 5.00 mass %. The lower limit of the amount of nitrogen in the insulation coating 20 is 0.10 mass % and more preferably 0.15 mass %. The upper limit of the amount of nitrogen in the insulation coating 20 is preferably 4.80 mass %, more preferably 4.50 mass %, still more preferably 4.00 mass %, and still more preferably 3.00 mass %.

[Method for Measuring Amount of Nitrogen in the Insulation Coating 20]

The amount of nitrogen in the insulation coating 20 is measured through the following method. The amount of each element in the insulation coating 20 is measured for the non-oriented electrical steel sheet 1, on which the insulation coating 20 is formed, using an energy dispersive X-ray spectroscopy (EDS) device. The analysis is performed on arbitrary five surfaces of the non-oriented electrical steel sheet 1 (insulation coating 20). From the analysis results, the amount (mass %) of nitrogen is obtained by excluding the peak intensity of iron (Fe) and taking the sum of peaks of remaining elements as 100 mass %.

[Amine Compound]

The insulation coating 20 preferably contains an amine compound. In the present specification, the amine compound is not necessarily limited to compounds containing amines. Amine compounds are compounds containing at least one selected from the group consisting of primary amines ($R_1$—$NH_2$), secondary amines ($R_1$—NH—$R_2$), tertiary amines ($R_1$—$NR_2$—$R_3$), isocyanate groups ($R_1$—N=C=O), amide groups ($R_1$—CO—N—$R_2R_3$), imide groups ($R_2$—CO—$NR_1$—CO—$R_3$), nitrile groups (R—CN), hydrazides ($R_1$—CO—$NR_2NR_3R_4$), guanidine groups (R—NH—CNH—$NH_2$), and nitrogen-containing heterocycles. An amine compound may be contained in the insulation coating 20 as part of the organic resins 202 or may be contained in the insulation coating 20 independently of the organic resins 202. In either case, the amine compound increases the polarity of the organic resins 202. Accordingly, the adhesion of the insulation coating 20 is enhanced. The amine compound is preferably contained in the insulation coating 20 as part of the organic resins 202. That is, the above-described organic resins 202 are preferably amine compound-containing organic resins 202.

The amine compound is preferably one or more selected from the group consisting of alkylamines, alkanolamines, polyamine compounds, isocyanate compounds, blocked isocyanate compounds, aromatic amine compounds, and nitrogen-containing heterocyclic compounds.

[Method for Specifying Amine Compound in Insulation Coating 20]

The amine compound in the insulation coating 20 can be specified through the following method. By analyzing gas generation behavior when the non-oriented electrical steel sheet 1, on which the insulation coating 20 is formed is heated, through the GC/MS method and the Fourier transform infrared spectroscopic analysis (FT-IR) to specify the presence or absence of amine compounds and the types of amine compounds.

[Preferred Coating Thickness of Insulation Coating 20]

The coating thickness of the insulation coating 20 is not particularly limited. The preferred coating thickness of the insulation coating 20 is 0.2 to 1.60 am. If the coating thickness is 0.2 to 1.60 µm, the insulation coating 20 exhibits superior insulation properties. However, even if the coating thickness of the insulation coating 20 is other than 0.2 to 1.60 km, both exceptional adhesion and suppression of the amount of $NO_x$ emitted can be achieved.

As described above, the non-oriented electrical steel sheet 1 of the present embodiment includes the base steel sheet 10 and insulation coatings 20 formed on the surfaces of the base steel sheet 10. The insulation coating 20 contains the metal phosphate 201, organic resins 202, and an amine compound. The amount of nitrogen in the insulation coating 20 is 5.0 mass % or lower. For this reason, both exceptional adhesion and suppression of the amount of $NO_x$ emitted can be achieved.

[Manufacturing Method]

An example of a method for manufacturing the non-oriented electrical steel sheet 1 of the present embodiment will be described. The manufacturing method described below is an example for manufacturing the non-oriented electrical steel sheet 1. Accordingly, the non-oriented electrical steel sheet 1 may be produced through manufacturing methods other than the manufacturing method described below. However, the manufacturing method described below is a suitable example of the method for manufacturing the non-oriented electrical steel sheet 1.

An example of the method for manufacturing the non-oriented electrical steel sheet 1 of the present embodiment includes: a step of applying a surface treatment agent containing the metal phosphate 201 and the organic resins 202 to the surface of the base steel sheet 10 (application step); and a step of heating the base steel sheet 10 to which the surface treatment agent is applied to form the insulation coating 20 (baking step). Hereinafter, each step will be described.

[Application Step]

In the application step, the surface treatment agent is applied to the surface of the base steel sheet 10. The application method is not particularly limited. Well-known application methods can be applied. The application methods are, for example, a roll coater method, a spray method, and a dip method.

[Regarding Surface Treatment Agent]

The surface treatment agent contains the metal phosphate and organic resins. Here, the above-described metal phosphate and organic resins are used as the metal phosphate and the organic resins in the surface treatment agent. When preparing the metal phosphate solution, it is preferable to mix at least any one of oxides of metal ions, carbonates, and hydroxides with various kinds of phosphoric acid such as orthophosphoric acid.

[Regarding Amount of Organic Resins in Surface Treatment Agent]

The amount of organic resins in the surface treatment agent is 1.0 to 70.0 parts by mass with respect to 100.0 parts by mass of the metal phosphate. In a case where the amount of organic resins is less than 1.0 parts by mass, coarsening of the metal phosphate cannot be sufficiently suppressed. In this case, adhesion of the insulation coating 20 with respect to the base steel sheet 10 deteriorates. On the other hand, in a case where the amount of organic resins is greater than 70.0 parts by mass, the insulation coating contains an excess amount of organic resins. In this case, adhesion of the insulation coating 20 with respect to the base steel sheet 10 deteriorates. Accordingly, the amount of organic resins in the surface treatment agent is 1.0 to 70.0 parts by mass with respect to 100 parts by mass of the metal phosphate.

The preferred lower limit of the amount of organic resins is preferably 2.0 parts by mass and more preferably 3.0 parts by mass with respect to 100.0 parts by mass of the metal phosphate. The upper limit of the amount of organic resins is preferably 65.0 parts by mass, more preferably 60.0 parts by mass, still more preferably 55.0 parts by mass, and still more preferably 50.0 parts by mass with respect to 100.0 parts by mass of the metal phosphate.

[Regarding Amine Compound]

The surface treatment agent may contain an amine compound in addition to the metal phosphate and the organic resins. The above-described amine compounds are used as an amine compound. An amine compound is contained in the surface treatment agent through any of the following methods.

(1) Amine compound as organic resin
(2) Amine compound as curing agent for organic resin
(3) Amine compound as modifier for organic resin
(4) Amine compound as mixture (1) Amine Compound as Organic Resin The amine compound may be contained in the surface treatment agent as part of organic resins. In this case, specifically, organic resins containing at least one selected from the group consisting of primary amines ($R_1$—$NH_2$), secondary amines ($R_1$—NH—$R_2$), tertiary amines ($R_1$—$NR_2$-$R_3$), isocyanate groups ($R_1$—N=C=O), amide groups ($R_1$—CO—N—$R_2R_3$), imide groups ($R_2$—CO—$NR_1$—CO—$R_3$), nitrile groups (R—CN), hydrazides ($R_1$—CO—$NR_2NR_3R_4$), guanidine groups (R—NH—CNH—$NH_2$), and nitrogen-containing heterocycles are used. Organic resins containing one or more selected from the group consisting of alkylamines, alkanolamines, polyamine compounds, isocyanate compounds, blocked isocyanate compounds, aromatic amine compounds, nitrogen-containing heterocyclic compounds, water-soluble imide resins, self-emulsifying polyamide resins, and aqueous amino resins (such as aqueous melamine, aqueous benzoguanamine, and aqueous urea resins) are preferably used.

(2) Amine Compound as Curing Agent for Organic Resin

The amine compound may be contained in the surface treatment agent as a curing agent for organic resins. In this case, specifically, curing agents containing at least one selected from the group consisting of primary amines ($R_1$—$NH_2$), secondary amines ($R_1$—NH—$R_2$), tertiary amines ($R_1$—$NR_2$—$R_3$), isocyanate groups ($R_1$—N=C=O), amide groups ($R_1$—CO—N—$R_2R_3$), imide groups ($R_2$—CO—$NR_1$—CO—$R_3$), nitrile groups (R—CN), hydrazides ($R_1$—CO—$NR_2NR_3R_4$), guanidine groups (R—NH—

CNH—NH$_2$), and nitrogen-containing heterocycles are used. The curing agents containing one or more selected from the group consisting of alkylamines, alkanolamines, polyamine compounds, isocyanate compounds, blocked isocyanate compounds, aromatic amine compounds, and nitrogen-containing heterocyclic compounds are preferably used.

(3) Amine Compound as Modifier for Organic Resin

The amine compound may be contained in the surface treatment agent as a modifier for organic resins. In this case, specifically, modifiers containing at least one selected from the group consisting of primary amines (R$_1$—NH$_2$), secondary amines (R$_1$—NH—R$_2$), tertiary amines (R$_1$—NR$_2$—R$_3$), isocyanate groups (R$_1$—N=C=O), amide groups (R$_1$—CO—N—R$_2$R$_3$), imide groups (R$_2$—CO—NR$_1$—CO—R$_3$), nitrile groups (R—CN), hydrazides (R$_1$—CO—NR$_2$NR$_3$R$_4$), guanidine groups (R—NH—CNH—NH$_2$), and nitrogen-containing heterocycles are used. The modifiers containing one or more selected from the group consisting of alkylamines, alkanolamines, polyamine compounds, isocyanate compounds, blocked isocyanate compounds, aromatic amine compounds, and nitrogen-containing heterocyclic compounds are preferably used.

(4) Amine Compound as Mixture

The amine compound may be contained in the surface treatment agent as a mixture. In this case, specifically, compounds containing at least one selected from the group consisting of primary amines (R$_1$—NH$_2$), secondary amines (R$_1$—NH—R$_2$), tertiary amines (R$_1$—NR$_2$-R$_3$), isocyanate groups (R$_1$—N=C=O), amide groups (R$_1$—CO—N—R$_2$R$_3$), imide groups (R$_2$—CO—NR$_1$—CO—R$_3$), nitrile groups (R—CN), hydrazides (R$_1$—CO—NR$_2$NR$_3$R$_4$), guanidine groups (R—NH—CNH—NH$_2$), and nitrogen-containing heterocycles are used. The compounds containing one or more selected from the group consisting of alkylamines, alkanolamines, polyamine compounds, isocyanate compounds, blocked isocyanate compounds, aromatic amine compounds, and nitrogen-containing heterocyclic compounds are preferably used.

In a case where the surface treatment agent contains an amine compound, the amount of amine compound in the surface treatment agent is 1 to 70 parts by mass with respect to 100.0 parts by mass of the metal phosphate. If the amount of amine compound is 1 part by mass or more, the compatibility with organic resins more stably increases. For this reason, adhesion of an insulation coating is more stably enhanced. On the other hand, if the amount of amine compound is 70 parts by mass or less, the insulation properties after stress relief annealing of an insulation coating are more stably enhanced. Accordingly, in a case where an amine compound is incorporated, the amount of amine compound in the surface treatment agent is set to 1 to 70 parts by mass with respect to 100.0 parts by mass of the metal phosphate.

[Regarding Curing Agent]

The surface treatment agent may contain a curing agent in addition to the metal phosphate and the organic resins. A curing agent cures organic resins. As described above, in the case where an amine compound is incorporated as a curing agent, the curing agent contains the amine compound. However, the curing agent is not limited to curing agents containing an amine compound. A curing agent can be selected from one or more selected from the group consisting of a polyamine curing agent, an acid anhydride-based curing agent, and a methylol group-containing precondensate.

A polyamine curing agent is, for example, one or more selected from the group consisting of an aliphatic polyamine, an alicyclic polyamine, an aromatic polyamine, a polyamide polyamine, and a modified polyamine.

An acid anhydride-based curing agent is, for example, one or more selected from the group consisting of monofunctional acid anhydrides (such as phthalic anhydride, hexahydrophthalic anhydride, methyltetrahydrophthalic anhydride, methylhexahydrophthalic anhydride, methyl nadic anhydride, and chlorendic anhydride), bifunctional acid anhydrides (such as pyromellitic anhydride, benzophenone tetracarboxylic anhydride, ethylene glycol bis (anhydrotrimate), and methylcyclohexene tetracarboxylic acid anhydride), and free acid anhydrides (such as trimellitic anhydride and polyazelaic anhydride).

A methylol group-containing precondensate is, for example, one or more selected from the group consisting of novolac type or resol type phenolic resins, urea resins, and melamine resins.

In a case where the surface treatment agent contains a curing agent, the amount of curing agent in the surface treatment agent is 0 to 50.0 parts by mass with respect to 100.0 parts by mass of the metal phosphate. In a case where the surface treatment agent contains a curing agent, the curing agent promotes curing of organic resins. In a case where the amount of curing agent is less than 50.0 parts by mass, adhesion of the insulation coating 20 with respect to the base steel sheet 10 is more stably enhanced. Accordingly, in a case where a curing agent is incorporated, the amount of curing agent in the surface treatment agent is 0 to 50.0 parts by mass with respect to 100.0 parts by mass of the metal phosphate.

The lower limit of the amount of curing agent is preferably 0.5 parts by mass, more preferably 1.0 parts by mass, and still more preferably 2.0 parts by mass with respect to 100.0 parts by mass of the metal phosphate. The upper limit of the amount of curing agent is 45.0 parts by mass, more preferably 40.0 parts by mass, and still more preferably 35.0 parts by mass with respect to 100.0 parts by mass of the metal phosphate.

[Baking Step]

In the baking step, the base steel sheet 10 to which the surface treatment agent is applied is heated to form the insulation coating 20. The baking conditions are a heat treatment temperature of 200° C. to 450° C., a dew point of 0° C. to 30° C., a heat treatment time of 10 to 60 seconds, and any temperature rising rate shown in temperature increase conditions (1) to (3). By satisfying these conditions, an arithmetic mean of a center line average roughness Ra$_{75}$ of the insulation coating 20 in a rolling direction of the base steel sheet 10 and a center line average roughness Ra75 of the insulation coating 20 in a direction perpendicular to the rolling direction of the base steel sheet 10 can be set to 0.20 to 0.50 m.

Temperature increase condition (1): the temperature increase rate is 20 to 40° C./s in a case where a concentration of the surface treatment agent is less than 16 wt %.

Temperature increase condition (2): the temperature increase rate is 5° C./s or higher and lower than 20° C./s in a case where the concentration of the surface treatment agent is 16 wt % or more and less than 30 wt %.

Temperature increase condition (3): the temperature increase rate is slower than 5° C./s in a case where the concentration of the surface treatment agent is 30 wt % or more.

For example, the amount of nitrogen in an insulation coating can be controlled to 0.05 to 5.00 mass % by incorporating the above-described amine compound into the surface treatment agent as an organic resin, a curing agent, a modifier, or a mixture and appropriately adjusting the baking conditions to the above-described ranges. In a case where heating is performed at a rate lower than the temperature increase rate of the temperature increase conditions (1) to (3), the heating is excessively performed and the amount of nitrogen in the insulation coating becomes less than 0.05 mass %. On the other hand, in a case where heating is performed at a rate faster than the temperature increase rate of the temperature increase conditions (1) to (3), bumping may occur, the formation of the insulation coating 20 may not be able to be controlled appropriately, and the amount of nitrogen in the insulation coating may be greater than 5.00 mass %.

The non-oriented electrical steel sheet 1 is manufactured through the above manufacturing process.

EXAMPLES

The effect of the non-oriented electrical steel sheet of the present embodiment will be described more specifically with reference to examples. The conditions in the following examples are examples of conditions adopted for confirming the feasibility and effect of the non-oriented electrical steel sheet of the present embodiment. Accordingly, the non-oriented electrical steel sheet of the present embodiment is not limited these examples of conditions.

Abase steel sheet (non-oriented electrical steel sheet) having a sheet thickness of 0.25 mm and containing 3.1% of Si, 0.6% of Al, and 0.2% of Mn with the balance being Fe and impurities by mass % was prepared. An application step was performed on the prepared base steel sheet. Specifically, the surface treatment agent having a composition shown in Table 1 was applied to the surface of the base steel sheet using a rubber roll type applicator.

TABLE 1

| Surface treatment agent No. | Phosphate (100 parts by weight) | Organic resin | | Curing agent | |
|---|---|---|---|---|---|
| | | Type | Formulation amount | Type | Formulation amount |
| 1 | Al phosphate | A | 35 | — | — |
| 2 | Al phosphate | B | 5 | a | 20 |
| 3 | Al phosphate: 5 + Mg phosphate: 5 | A | 30 | b | 20 |
| 4 | Al phosphate: 6 + Mo phosphate: 4 | B | 10 | c | 10 |
| 5 | Al phosphate: 4 + Zn phosphate: 6 | C | 20 | a | 20 |
| 6 | Al phosphate: 8 + Mn phosphate: 2 | B | 3 | b | 10 |
| 7 | Al phosphate: 3 + Zn phosphate: 7 | A | 45 | c | 3 |
| 8 | Mg phosphate: 6 + Mo phosphate: 4 | B | 20 | — | — |
| 9 | Al phosphate | B | 10 | c | 0.6 |
| 10 | Mg phosphate: 6 + Mo phosphate: 4 | B | 10 | d | 5 |
| 11 | Al phosphate | B | 10 | a | 20 |
| 12 | Al phosphate | B | 3 | b | 20 |
| 13 | Al phosphate | A | 10 | b | 15 |

The "metal phosphate (100 parts by mass)" column in Table 1 shows the types of metal phosphates contained in the surface treatment agent and the mass proportion of the metal phosphates. For example, in surface treatment agent No. 1, the metal phosphate consists of Al phosphate. In surface treatment agent No. 3, Al phosphate and Mg phosphate are contained as metal phosphates at a mass ratio of 5:5. In surface treatment agent No. 4, Al phosphate and Mo phosphate are contained as metal phosphates at a mass ratio of 6:4.

A to C of "type" in the "organic resin" column in Table 1 are as follows.
  A: Amine compound-containing epoxy resin emulsion obtained by modifying a bisphenol A-type epoxy resin having an epoxy equivalent of 5,000 using methacrylic acid and ethyl acrylate to form an acrylic modified epoxy resin, and then causing a reaction with dimethylethanolamine to form the emulsion
  B: An epoxy resin-amine adduct formed by dissolving a bisphenol A-type epoxy resin having an epoxy equivalent of 980 in butyl cellosolve and reacting it with N-methylethanolamine at 90° C.
  C: Epoxy resin emulsion obtained by forcibly stirring and emulsifying a bisphenol A-type epoxy resin having an epoxy equivalent of 300 using an emulsifier The "formulation amount" in the "organic resin" column in Table 1 shows parts by mass of an organic resin with respect to 100 parts by mass of the metal phosphates.

a to d of "type" in the "curing agent" column in Table 1 are as follows.
  a: A polyamide resin dissolved and dispersed in water
  b: An epoxy resin-amine addition curing agent formed by adding a reaction mixture obtained by reacting dioxane, methyl ethyl ketone oxime, and 2,4-tolylene diisocyanate with each other and forming partially blocked diisocyanate to an epoxy resin-amine adduct at 60° C.
  c: Polyamidoamine dissolved and dispersed in water
  d: Maleic acid anhydride dispersed in water The "formulation amount" in the "curing agent" column in Table 1 shows parts by mass of a curing agent with respect to 100 parts by mass of the metal phosphates.

The surface treatment agent of each number was applied to the surface of a base steel sheet so that the application amount became 0.8 g/m$^2$. A baking treatment was performed on the base steel sheet to which the surface treatment agent was applied. For each test number, the heat treatment temperature was 300° C., the dew point was 30° C., and the heat treatment time was 60 seconds. The temperature increase rate of the baking treatment for each test number is shown in Table 2. Through the above steps, a non-oriented electrical steel sheet having an insulation coating formed on the surface of a base steel sheet was manufactured.

TABLE 2

| Test No. | Surface treatment agent No. | Concentration of surface treatment agent (wt %) | Temperature increase rate (° C./s) | Surface roughness (Ra, μm) | Concentration of [N] by EDS (%) | Properties before stress relief annealing | | | Properties after stress relief annealing | | NOx generation amount (ppm) | Remarks |
|---|---|---|---|---|---|---|---|---|---|---|---|---|
| | | | | | | Insulation properties | Corrosion resistance | Elution properties | Adhesion | Corrosion resistance | | |
| 1 | 1 | 15 | 20 | 0.36 | 1.20 | 4 | 8 | 13 | 3 | 8 | 530 | Invention example |
| 2 | 2 | 12 | 25 | 0.37 | 3.60 | 4 | 10 | 6 | 3 | 9 | 700 | Invention example |
| 3 | 3 | 25 | 15 | 0.28 | 1.40 | 4 | 8 | 21 | 4 | 7 | 140 | Invention example |
| 4 | 4 | 25 | 15 | 0.31 | 2.90 | 3 | 9 | 32 | 4 | 8 | 190 | Invention example |
| 5 | 5 | 28 | 8 | 0.21 | 0.60 | 3 | 7 | 26 | 3 | 7 | 50 | Invention example |
| 6 | 6 | 10 | 35 | 0.39 | 4.60 | 3 | 9 | 10 | 3 | 6 | 800 | Invention example |
| 7 | 7 | 28 | 10 | 0.26 | 1.10 | 3 | 8 | 28 | 4 | 8 | 120 | Invention example |
| 8 | 8 | 25 | <u>4</u> | 0.21 | <u>0.01</u> | 2 | 6 | 41 | 1 | 2 | 18 | Comparative example |
| 9 | 9 | 25 | 5 | 0.24 | 0.30 | 3 | 5 | 21 | 2 | 4 | 26 | Invention example |
| 10 | 10 | 35 | 4 | 0.22 | 0.10 | 3 | 5 | 44 | 2 | 3 | 33 | Invention example |
| 11 | 11 | 10 | <u>60</u> | 0.48 | <u>6.70</u> | 3 | 7 | 14 | 3 | 7 | 1400 | Comparative example |
| 12 | 12 | 10 | <u>72</u> | 0.43 | <u>8.30</u> | 1 | 4 | 52 | 2 | 6 | 2600 | Comparative example |
| 13 | 13 | 10 | <u>52</u> | 0.47 | <u>5.80</u> | 3 | 8 | 19 | 4 | 7 | 1100 | Comparative example |
| 14 | 2 | 30 | <u>60</u> | <u>0.55</u> | 1.20 | 3 | 6 | 60 | 3 | 6 | 2100 | Comparative example |
| 15 | 5 | 10 | 8 | <u>0.17</u> | 6.40 | 2 | 5 | 32 | 1 | 4 | 80 | Comparative example |

The underline indicates that the result is out of the range.

[Evaluation Test 1]

A surface roughness measurement test, a nitrogen content measurement test through EDS, an insulation property evaluation test, a corrosion resistance evaluation test, an elution property evaluation test, and a content specification test through a GC/MS method were carried out for each manufactured non-oriented electrical steel sheet.

A commercially available surface roughness measurement device SE3500 manufactured by Kosaka Laboratory Ltd. was used for measuring the surface roughness, and 10 mm in length was measured in each of two directions, the rolling direction of a base steel sheet and the direction perpendicular to the rolling direction of the base steel sheet. As an evaluation index, the center line average roughness ($Ra_{75}$, m) was used, and the arithmetic mean in two directions was used as a measurement value. The measurement was complied with JIS B0601:2013. Ra in Table 2 means $Ra_{75}$.

[Nitrogen Content Measurement Test Through EDS]

The amount of nitrogen in an insulation coating of a non-oriented electrical steel sheet for each test number was measured through the following method. The amount of each element in the insulation coating was measured for the non-oriented electrical steel sheet, on which the insulation coating was formed, using an energy dispersive X-ray spectroscopy device. The analysis is performed on arbitrary five surfaces of the non-oriented electrical steel sheet (insulation coating). From the analysis results, the amount (mass %) of nitrogen was obtained by excluding the peak intensity of iron (Fe) and taking the sum of peaks of remaining elements as 100 mass %. The results are shown in the "Concentration of [N] by EDS (%)" column in Table 2.

[Insulation Property Evaluation Test]

The insulation properties of a non-oriented electrical steel sheet of each test number were evaluated through the following method. The interlayer resistance of a non-oriented electrical steel sheet of each test number was measured in accordance with JIS C2550-4:2019. The insulation properties were evaluated as follows based on the obtained interlayer resistance value.

4 (double circle): Interlayer resistance is 30 $\Omega \cdot cm^2$/sheet or more 3 (circle): Interlayer resistance is 10 $\Omega \cdot cm^2$/sheet or more and less than 30 $\Omega \cdot cm^2$/sheet 2 (triangle): Interlayer resistance is 3 $\Omega \cdot cm^2$/sheet or more and less than 10 $\Omega \cdot cm^2$/sheet 1 (cross): Interlayer resistance is less than 3 $\Omega \cdot cm^2$/sheet The obtained evaluation results for the insulation properties are shown in the "insulation properties" column in Table 2. Evaluations 4 and 3 were considered acceptable.

[Corrosion Resistance Evaluation Test]

The corrosion resistance of a non-oriented electrical steel sheet of each test number was evaluated through the following method. A steel sheet sample having a width of 30 mm and a length of 300 mm was collected from a non-oriented electrical steel sheet of each test number. A 5% NaCl aqueous solution was naturally dropped onto each steel sheet sample in an atmosphere of 35° C. for 7 hours in accordance with a salt spray test described in JIS Z2371:2015. Thereafter, the area proportion of a rusted region (hereinafter referred to as a rust area proportion) on the surface of each steel sheet sample was obtained. The corrosion resistance was evaluated by the following 10-point evaluation according to the obtained rust area.

10: Rust area proportion is 0%
9: Rust area proportion is 0.10% or less
8: Rust area proportion is greater than 0.10% and 0.25% or less
7: Rust area proportion is greater than 0.25% and 0.50% or less
6: Rust area proportion is greater than 0.50% and 1.00% or less
5: Rust area proportion is greater than 1.00% and 2.50% or less
4: Rust area proportion is greater than 2.50% and 5.00% or less
3: Rust area proportion is greater than 5.00% and 10.00% or less
2: Rust area proportion is greater than 10.00% and 25.00% or less
1: Rust area proportion is greater than 25.00% and 50.00% or less The obtained corrosion resistance is shown in the "corrosion resistance, properties before stress relief annealing" column in Table 2. 5 or more scores was considered acceptable.

[Elution Resistance Evaluation Test]

The elution resistance of a non-oriented electrical steel sheet of each test number was evaluated through the following method. A steel sheet sample having a width of 30 mm and a length of 300 mm was collected from a non-oriented electrical steel sheet of each test number. The steel sheet sample was boiled in boiling pure water for 10 minutes. The amount of phosphoric acid eluted in the pure water (solution) after boiling was measured. Specifically, the pure water (solution) after boiling was cooled. The solution was diluted with pure water, and the concentration of phosphoric acid in the solution was measured through ICP-AES. The amount of phosphoric acid eluted (mg/m$^2$) was obtained from the dilution rate. The results are shown in the "elution properties" column in Table 2. If the amount of phosphoric acid eluted was less than 140 mg/m$^2$, it was considered as acceptable (exceptional elution resistance).

[Content Specification Test by GC/MS]

Organic resins in an insulation coating of each test number were specified through the following method. The presence or absence of organic resins and the types of organic resins were specified by analyzing gas generation behavior when heating a non-oriented electrical steel sheet, on which an insulation coating was formed, through a GC/MS method. As a result, it was confirmed that insulation coatings of all the test numbers contained an epoxy resin and an amine compound.

[Evaluation Test 2]

An adhesion evaluation test, a corrosion resistance evaluation test, and NOx generation amount measurement test were carried out for a non-oriented electrical steel sheet for each test number.

[Adhesion Evaluation Test]

The adhesion of a non-oriented electrical steel sheet of each test number was evaluated through the following method. A steel sheet sample having a width of 30 mm and a length of 300 mm was collected from a non-oriented electrical steel sheet of each test number. The steel sheet sample was subjected to stress relief annealing. In the stress relief annealing, the annealing temperature was set to 800° C. and the annealing time was set to 2 hours in a nitrogen stream. Adhesive tape was attached on an insulation coating of each steel sheet sample after stress relief annealing. Each steel sheet sample with the adhesive tape attached was wound around a metal rod with a diameter of 10 mm. Thereafter, the steel sheet sample was separated from the metal rod. That is, bending with a diameter of 10 mm was imparted to the steel sheet sample. Thereafter, the adhesive tape was peeled off from the steel sheet sample, and the proportion (area proportion) of the insulation coating remaining without being peeled off from the base steel sheet was measured. The adhesion was evaluated as follows based on the obtained area proportion.

4 (double circle): The area proportion of the remaining insulation coating was 100%. That is, the insulation coating was not peeled off.
3 (circle): The area proportion of the remaining insulation coating was 90% or more and less than 100%.
2 (triangle): The area proportion of the remaining insulation coating was 50% or more and less than 90%.
1 (cross): The area proportion of the remaining insulation coating was less than 50%.

The obtained evaluation results for the adhesion are shown in the "adhesion" column in Table 2. Evaluations 4, 3, and 2 were considered acceptable.

[Corrosion Resistance Evaluation Test]

Stress relief annealing was performed on a non-oriented electrical steel sheet for each test number. Annealing was performed in a nitrogen stream at 750° C. for 2 hours. The corrosion resistance of a non-oriented electrical steel sheet of each test number was evaluated through the following method. A steel sheet sample having a width of 30 mm and a length of 120 mm was collected from a non-oriented electrical steel sheet of each test number. The steel sheet sample was held at a temperature of 25° C. to 40° C., a dew point of 90% to 95%, and a cycle of 95 to 100% for 240 hours in accordance with a high-temperature and high-humidity test described in JIS C60068-3-4:2001. Thereafter, the area proportion of a rusted region (hereinafter referred to as a rust area proportion) on the surface of each steel sheet sample was obtained. The corrosion resistance was evaluated by the following 10-point evaluation according to the obtained rust area.

10: Rust area proportion is 0%
9: Rust area proportion is 0.10% or less
8: Rust area proportion is greater than 0.10% and 0.25% or less
7: Rust area proportion is greater than 0.25% and 0.50% or less
6: Rust area proportion is greater than 0.50% and 1.00% or less
5: Rust area proportion is greater than 1.00% and 2.50% or less
4: Rust area proportion is greater than 2.50% and 5.00% or less
3: Rust area proportion is greater than 5.00% and 10.00% or less
2: Rust area proportion is greater than 10.00% and 25.00% or less
1: Rust area proportion is greater than 25.00% and 50.00% or less The obtained corrosion resistance is shown in the "corrosion resistance, properties after stress relief annealing" column in Table 2. 5 or more scores was considered acceptable.

[NOx Generation Amount Measurement Test]

The NOx generation amount of a non-oriented electrical steel sheet of each test number was measured through the following method. A test piece having a width of 150 mm and a length of 200 mm was obtained from a non-oriented electrical steel sheet of each test number. The test piece was annealed in a vacuum annealing furnace at 750° C. for 2 hours in a nitrogen gas atmosphere, and gas generated was absorbed in an absorption liquid through gas flow. Thereafter, the amount of NOx was measured through an ion chromatography method of JIS K 0104. The results are shown in the "NOx generation amount (ppm)" column in Table 2. Those with less than 1,000 ppm were considered acceptable.

[Evaluation Results]

The evaluation results are shown in Table 2. Referring to Table 2, the insulation coatings of the non-oriented electrical steel sheets of Test Nos. 1 to 7, 9, and contained metal phosphates and an organic resin. Furthermore, the temperature increase rate in the baking step satisfied the temperature increase conditions (1) to (3). For this reason, the amount of nitrogen in the insulation coating became 0.05 to 5.00 mass %. As a result, both exceptional adhesion and suppression of the amount of NOx emitted could be achieved.

On the other hand, in Test No. 8, the temperature increase rate in the baking step was too slow. For this reason, the amount of nitrogen in the insulation coating was less than 0.05 mass %. As a result, although the NOx generation amount was low, the adhesion was low.

In Test Nos. 11 to 13, the temperature increase rate in the baking step was too fast. For this reason, the amount of nitrogen in the insulation coating was greater than 5.00 mass %. As a result, although the adhesion was exceptional, the NOx generation amount was too large. In No. 14, the temperature increase rate was too fast. For this reason, the surface roughness was greater than 0.50 µm. As a result, in No. 14, the NOx generation amount was too large. In No. 15, the temperature increase rate was too slow. For this reason, the surface roughness was less than 0.20. As a result, in No. 15, the adhesion was reduced.

The embodiment of the present disclosure has been described above. However, the above-described embodiment is merely an example for implementing the present disclosure. Accordingly, the present disclosure is not limited to the above-described embodiment, and the above-described embodiment can be appropriately modified within the scope not departing from the gist thereof.

BRIEF DESCRIPTION OF THE REFERENCE SYMBOLS

1 Non-oriented electrical steel sheet
10 Base steel sheet
20 Insulation coating
201 Metal phosphate
202 Organic resin

The invention claimed is:

1. A non-oriented electrical steel sheet comprising:
a base steel sheet; and
an insulation coating formed on a surface of the base steel sheet,
wherein the insulation coating contains
a metal phosphate and
an organic resin,
wherein an arithmetic mean of a center line average roughness $Ra_{75}$ of the insulation coating in a rolling direction of the base steel sheet and a center line average roughness $Ra_{75}$ of the insulation coating in a direction perpendicular to the rolling direction is 0.20 to 0.50 µm, and
wherein an amount of nitrogen in the insulation coating is 0.05 to 5.00 mass %.

2. The non-oriented electrical steel sheet according to claim 1,
wherein the metal phosphate contains
one or more selected from the group consisting of Zn phosphate, Mn phosphate, Al phosphate, and Mo phosphate, and
wherein the organic resin contains an epoxy resin as a main component.

3. The non-oriented electrical steel sheet according to claim 1,
wherein the insulation coating contains an amine compound, and
wherein the amine compound is one or more selected from the group consisting of alkylamines, alkanolamines, polyamine compounds, isocyanate compounds, blocked isocyanate compounds, aromatic amine compounds, and nitrogen-containing heterocyclic compounds.

4. The non-oriented electrical steel sheet according to claim 2,
wherein the insulation coating contains an amine compound, and
wherein the amine compound is one or more selected from the group consisting of alkylamines, alkanolamines, polyamine compounds, isocyanate compounds, blocked isocyanate compounds, aromatic amine compounds, and nitrogen-containing heterocyclic compounds.

5. The non-oriented electrical steel sheet according to claim 1,
wherein the base steel sheet contains, by mass %,
Si: 2.5% to 4.5%,
Al: 0.1% to 1.5%, and
Mn: 0.2% to 4.0%.

6. The non-oriented electrical steel sheet according to claim 2,
wherein the base steel sheet contains, by mass %,
Si: 2.5% to 4.5%,
Al: 0.1% to 1.5%, and
Mn: 0.2% to 4.0%.

7. The non-oriented electrical steel sheet according to claim 3,
wherein the base steel sheet contains, by mass %,
Si: 2.5% to 4.5%,
Al: 0.1% to 1.5%, and
Mn: 0.2% to 4.0%.

8. The non-oriented electrical steel sheet according to claim 4,
wherein the base steel sheet contains, by mass %,
Si: 2.5% to 4.5%,
Al: 0.1% to 1.5%, and
Mn: 0.2% to 4.0%.

9. A method for manufacturing the non-oriented electrical steel sheet according to claim 1, the method comprising:
applying a surface treatment agent containing a metal phosphate and an organic resin to a surface of a base steel sheet; and
heating the base steel sheet to which the surface treatment agent is applied at a heat treatment temperature of 200° C. to 450° C., a dew point of 0° C. to 30° C., a heat treatment time of 10 to 60 seconds, and any temperature increase rate shown in temperature increase conditions (1) to (3) to form an insulation coating,
temperature increase condition (1): the temperature increase rate is 20 to 40° C./s in a case where a concentration of the surface treatment agent is less than 16 wt %, temperature increase condition (2): the temperature increase rate is 5° C./s or higher and lower than 20° C./s in a case where the concentration of the surface treatment agent is 16 wt % or more and less than 30 wt %, and temperature increase condition (3): the temperature increase rate is slower than 5° C./s in a case where the concentration of the surface treatment agent is 30 wt % or more.

\* \* \* \* \*